Aug. 29, 1950 V. MILLS 2,520,425
CONTINUOUS HYDROGENATION OF UNSATURATED OILS
Filed May 2, 1947 3 Sheets-Sheet 1
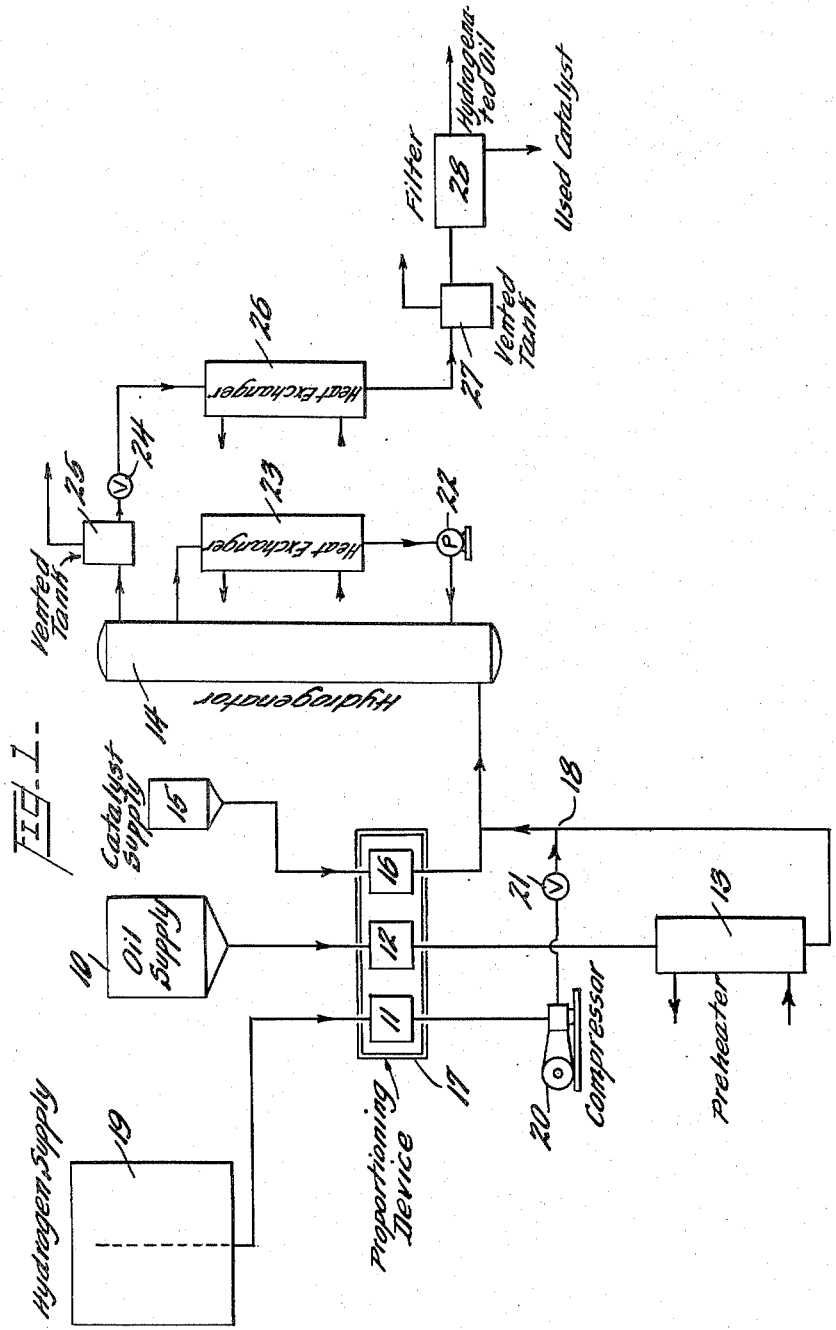
Inventor
Victor Mills,
By Watson, Cole, Grindle & Watson
Attorney

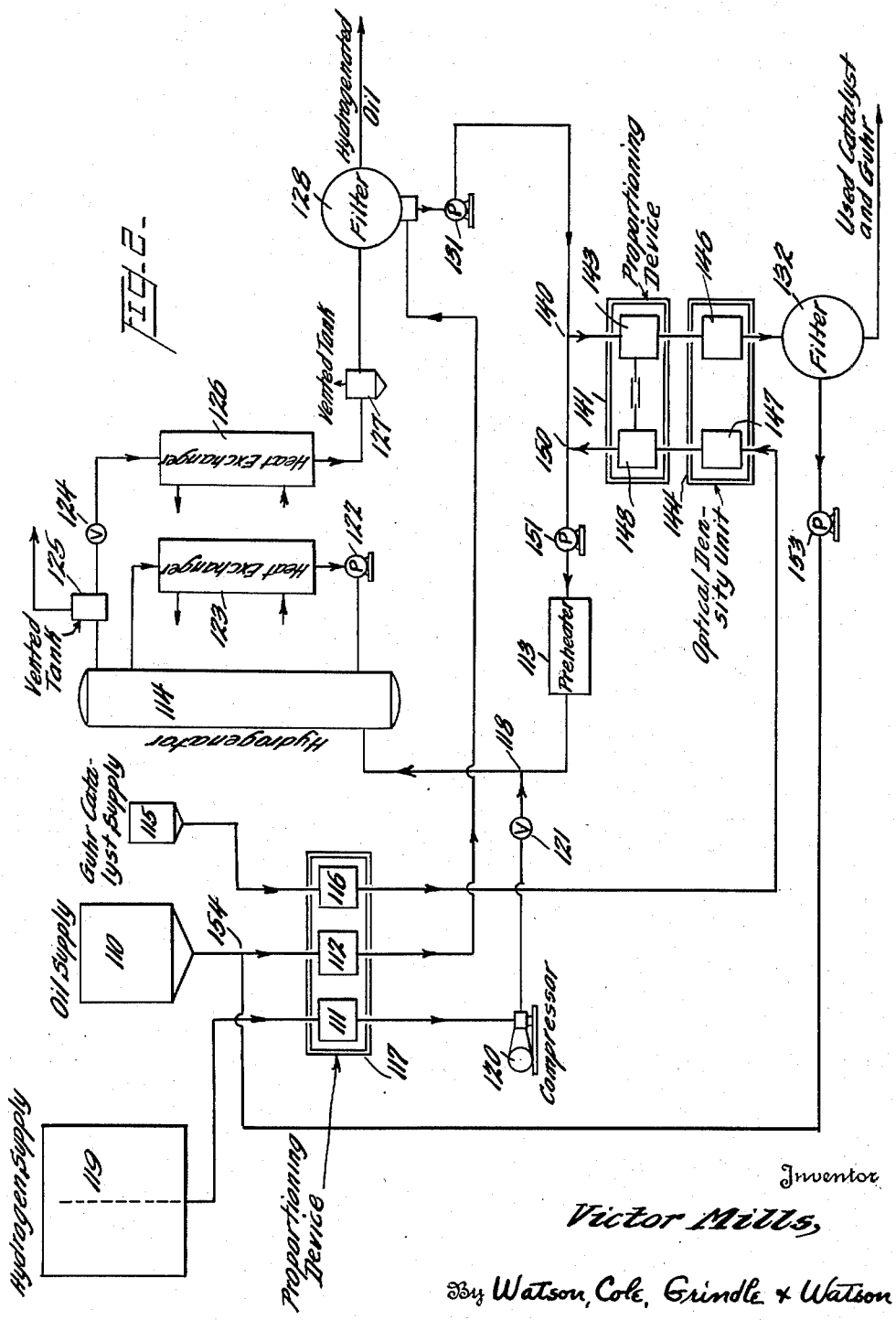

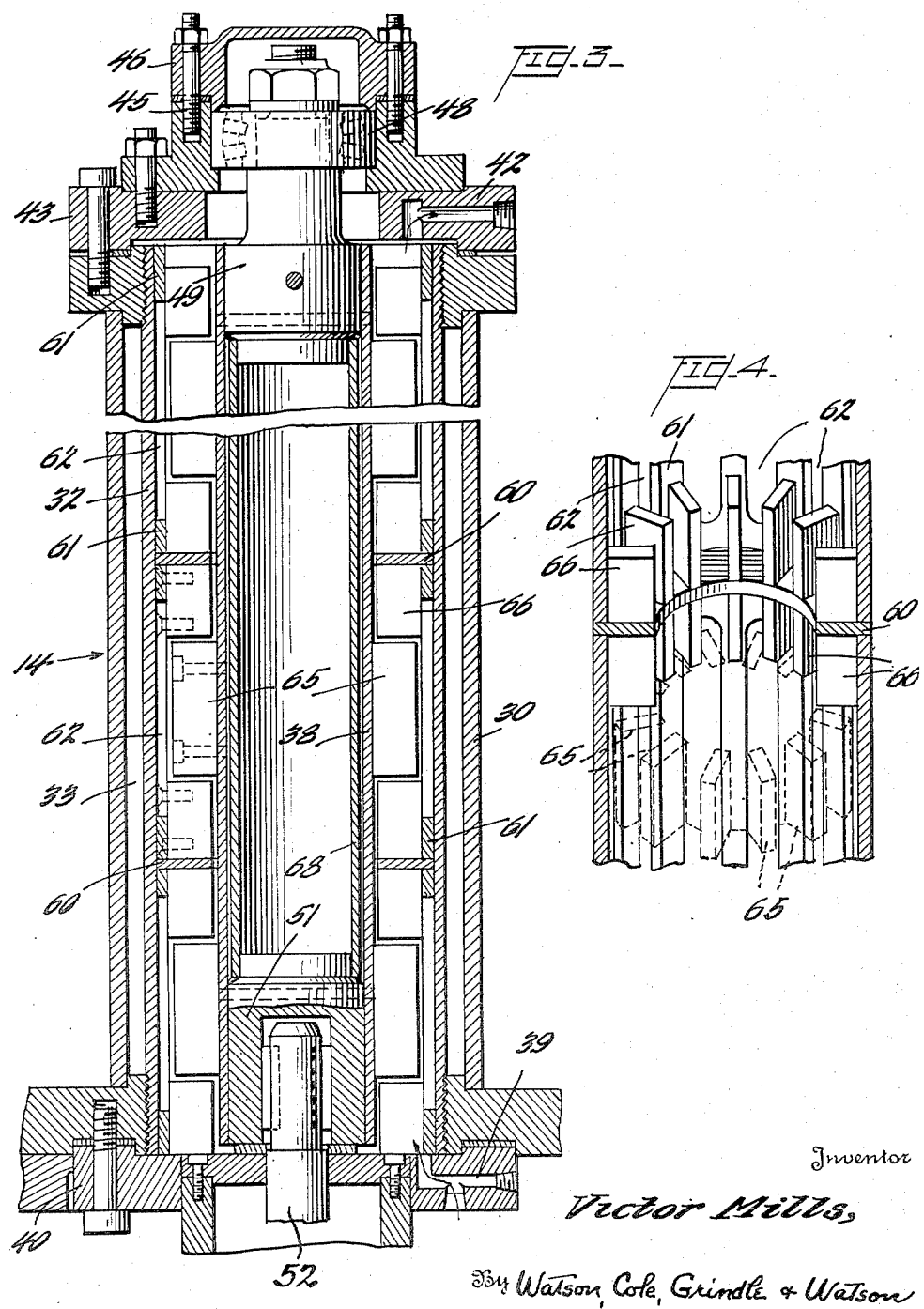

Patented Aug. 29, 1950

2,520,425

UNITED STATES PATENT OFFICE 2,520,425

CONTINUOUS HYDROGENATION OF UNSATURATED OILS

Victor Mills, Cincinnati, Ohio, assignor to The Procter and Gamble Company, Ivorydale, Ohio, a corporation of Ohio Application May 2, 1947, Serial No. 745,663

5 Claims. (Cl. 260—409)

This invention relates to continuous processes of hydrogenating unsaturated triglyceride oils. More particularly it relates to a novel method of controlling the endpoint of the reaction when the hydrogenation is stopped short of complete saturation of the oil, this method of control being particularly advantageous with fast hydrogenation rates.

The partial hydrogenation of the carbon to carbon double bonds of unsaturated organic liquids, particularly unsaturated higher fatty acids and their glycerides and other esters, has heretofore been conducted as a batch process more often than as a continuous process, and in both forms of practice it has been customary to supply an excess of hydrogen over the amount needed to attain the desired amount of hydrogenation, this excess usually being drawn off through an outlet in or near the top of the hydrogenation vessel, and recirculated for re-use in the process. The speed of reaction has been relatively slow and the operator has thus been afforded the opportunity of sampling the liquid from time to time during the course of its hydrogenation, and of following the course of the reaction by measuring the refractive indices of these samples, and of controlling the extent or endpoint of the reaction accordingly.

A recent advance in hydrogenation practice employs unprecedentedly rapid reaction rates in a continuous process in which the oil as a continuous phase, carrying fine dispersions of hydrogen gas and hydrogenation catalyst, is pumped through an intensely agitated reaction zone. Reaction rates in the order of 5 to 10 iodine value units drop per minute are common in this practice, and rates of 20 to 30 and even higher are readily attainable. When the oil is to be hydrogenated just enough to lower its iodine value some 25 to 50 units, as is frequently the case especially in making base stocks for plastic vegetable shortening, it will be apparent that the average particle of oil passes entirely through and out of the hydrogenation zone in a very short time, which may be less than a minute in the more extreme cases and under 5 minutes in a great many cases. One can readily appreciate that under these circumstances accurate control of the extent of hydrogenation by the customary method of sampling, measuring the refractive indices of these samples, and then making appropriate adjustments of process controls, is not the ideal method to say the least. This method may, however, still remain a useful aid in the control of rapid continuous hydrogenation whenever the reaction conditions can be so well standardized that the reaction rate remains practically constant for extended periods of time; but this standardization of conditions affecting reaction rate is frequently uncertain because of irregularities in such factors as catalyst activity and traces of catalyst poisons in the reactants.

A principal object of the present invention is to provide an accurate and simple method of controlling the degree of unsaturation of the product of continuous hydrogenation of unsaturated glyceride oils.

Another object is to provide a control method of this character which within reasonable limits is independent of variations in the hydrogenation reaction rate.

Another object is to provide a method of this character which may be used with good results at the highest attainable hydrogenation rates.

Another object is to provide a novel method of increasing both the reaction rate and the effectiveness of the catalyst, in a manner which utilizes the special advantages of the present method of hydrogenation control.

Although the present specification and claims are written principally with regard to glyceride oils, it is to be understood that the invention is applicable also to unsaturated higher fatty acids and their other esters.

The process of the present invention comprises supplying the unsaturated oil to the continuous hydrogenation process at a quantitatively controlled rate and simultaneously supplying to the process an amount of hydrogen gas quantitatively proportioned in just sufficient amount to hydrogenate the oil to the desired iodine value, i. e. an amount of hydrogen which is the stoichiometric proportion calculated to give the desired reduction in iodine value.

A supply of hydrogenation catalyst, in finely divided form, is continuously fed into the reaction zone either suspended in the main supply of unsaturated oil to be hydrogenated or separately at a point close to the main oil inlet. The catalyst is conveniently supplied as a slurry in a small portion of the oil to be hydrogenated, and the supply of this slurry is usually proportioned in some fixed relation to the principal oil supply. Vigorous mechanically induced agitation is provided in the reaction zone to provide intimate and renewed contact between oil and catalyst and gas. The reaction temperature is maintained within a range suitable for rapid chemical addition of hydrogen at the unsaturated bonds of the oil, normally about 100° C. to 250° C., and the hydrogen is supplied at superatmospheric pressure, normally from about 20 pounds per square inch gauge pressure upwards to 500 pounds per square inch. The amount of catalyst and its activity, and the freedom of the reactants from catalyst poisons should be adequate to promote rapid reaction, and the volumetric capacity of the reaction zone should be sufficiently great, in relation to the oil supply rate, to allow time for the hydrogenation to go to the desired endpoint under the existing conditions, allowing sufficient excess capacity to provide a reasonable factor of safety to take care of such inadvertent variations in the reaction rate as may be expected to occur.

Under the foregoing conditions of the process the hydrogen gas, which is supplied at a rate proportionate to the need for hydrogen to effect the desired change in the iodine value of the oil supply, is totally consumed within the hydrogenation zone with the possible exception of a small amount of unreacted hydrogen which remains dissolved in the hydrogenated oil product.

The process is especially advantageous when the reaction rate is at least as rapid as five units drop in iodine value per minute, for then a hydrogenation vessel of an economically small size may be employed to produce the hydrogenated product in quantity suitable for commercial practice. Under circumstances such that a low production rate is not objectionable, the present process may be employed even with relatively low reaction rates, and under these conditions a hydrogenation temperature below 100° C. and/or hydrogen pressure below 20 pounds per square inch may be desirable.

A preferred mode of practicing the process consists in maintaining an abundant supply of hydrogenation catalyst in the hydrogenation zone at all times, this being accomplished without an abnormally high usage of new catalyst by continuously feeding back to the hydrogenation zone a major portion of the catalyst separated from the hydrogenated oil which has left the hydrogenation zone. This practice is especially advantageous when used in conjunction with a combination of conditions favoring very rapid reaction rates, i. e., high initial catalyst activity, violent agitation, superatmospheric hydrogen pressure, and temperatures above 100° C., for under such conditions the time of contact of a given particle of catalyst with the oil, and with such catalyst poisons as may be present in the reactants, during a single pass through the hydrogenation zone is so short that the decline in activity of the catalyst is relatively small and its re-use value is proportionately great. This practice of catalyst recirculation thus substantially eliminates the catalyst as a limitation on the speed of the reaction, for it insures having an adequate amount of comparatively active catalyst available throughout the reaction zone. When catalyst recirculation is practiced in this manner the task of endpoint control, which would be difficult because of changing catalyst activity and irregularities in return catalyst proportioning, is satisfactorily taken care of by my process of proportioning the oil and hydrogen feed rates and allowing time for all gas to react with the oil.

Although the apparatus suitable for the practice of the process forms no part of the present invention, one may gain a better understanding of the process by considering a typical example as carried out with the specific apparatus illustrated in the accompanying drawings, in which Figure 1 is a schematic flow chart showing the principal elements of a typical continuous hydrogenation system;

Figure 2 is a schematic flow chart of a modified continuous hydrogenation system designed to permit recirculation and re-use of a portion of the catalyst removed from the hydrogenated product;

Figure 3 is a vertical section of a mechanically agitated continuously hydrogenated vessel, and Figure 4 is a fragmentary vertical section of the inner chamber of this vessel, showing in perspective some of the hold-back baffles, or stators, and one of the horizontal baffles.

Referring to Figure 1, the unsaturated oil to be hydrogenated is delivered from supply tank 10 by means of pump 12 which is operated at a speed bearing an adjustable fixed relation to the speed of gas meter 11, through a tubular preheater 13 to and through the hydrogenator 14. A suitable hydrogenation catalyst suspended in a small quantity of the oil to be hydrogenated is delivered from catalyst supply tank 15 by means of pump 16 into the oil supply line near its point of entry, this pump also being operated at a speed bearing a predetermined relation, which may be varied, to the speed of gas meter 11. Pumps 12 and 16 and meter 11 form parts of a fluid proportioning device 17, which may suitably be a device such as is described in Short Patent 2,024,480. A continuous supply of hydrogen is introduced into the oil feed pipeline at a point ahead of the hydrogenator, for example at point 18, the hydrogen supply being drawn from a suitable reservoir or constant pressure supply as illustrated at 19, through a positive displacement rotary gas meter 11 by means of compressor 20 and through a pressure regulating valve 21. While flowing through the hydrogenator 14, the mixture of the oil to be hydrogenated, the catalyst, and the hydrogen is subjected to violent agitation to bring these three materials into intimate contact with one another and to bring about a rapid movement of the individual particles of each of the non-liquid phases in contact with the particles of the liquid phase, thus promoting a high velocity of the hydrogenation reactions which occur in this vessel. The heat of reaction which is liberated may, although this is not at all essential to the operation of the process, be partially or completely removed by circulating a cooling medium through a jacket surrounding the reaction space in the hydrogenator, the cooling medium being circulated by means of pump 22 and the heat being removed from the cooling medium in heat exchanger 23. The reaction mixture passing through hydrogenator 14 is maintained at superatmospheric pressure, and the pressure may conveniently be regulated by means of the adjustable relief valve 24 in the outlet line leading from the hydrogenator. If at times the hydrogen supplied to the process is not all consumed and/or dissolved in the outgoing hydrogenated product, for example during start-up or control adjustment periods or in case of interruption of the catalyst supply, any surplus gaseous hydrogen may be separated from the hydrogenation product and bled off through the top of small tank 25. The hydrogenated oil leaving the hydrogenator is cooled by means of heat exchanger 26, and any remaining hydrogen and other gas which has come out of solution subsequent to the drop in pressure at valve 24 is then separated from the hydrogenated oil in small tank 27, and the catalyst is then removed from the oil, for example by means of filter 28.

The hydrogenator 14 of the system just described may be constructed as shown more particularly in Figures 3 and 4 in which are illustrated sectional views of a preferred type of hydrogenation apparatus. Thus the hydrogenator may comprise an outer jacket 30, and an inner cylinder 32, the jacket and cylinder defining an annular space 33 within which is circulated a fluid coolant. A hollow shaft 38, of substantially less diameter than cylinder 32 is disposed coaxially within the cylinder and supported for rotation about its vertical axis, shaft 38 and cylinder 32 defining an annular reaction passage in which the mixture of the oil, the hydrogen, and the catalytic agent, is intensely agitated while flowing in an upward direction, being introduced through an inlet passage 39 formed in an annular plate 40 at the lower end of cylinder 32, and discharging through an outlet passage 42 in an annular plate 43 at the upper end of cylinder 32.

The hydrogenator is closed at its upper end by a cap structure comprising plate 43 and closure members 45 and 46, the several parts being bolted together as shown in Figure 3. A radial thrust bearing 48, seated in member 45 and retained in position by member 46 engages and supports a shaft 49 which extends within and is secured to the hollow shaft 38, whereby the latter is journaled for rotation. Received within and secured to shaft 38 at its lower end is a coupling element 51; a drive shaft 52, disposed coaxially of shaft 38, extends within and is secured for rotation with coupling element 51. Drive shaft 52 is journaled for rotation in the supporting base structure, the hydrogenator being suitably mounted on this base structure. A motor drives shaft 52 through bevel gearing, whereby the hollow shaft 38 is rotated rapidly. It will be appreciated that the details of this construction may be varied widely.

The annular reaction passage between shaft 38 and cylinder 32 is divided into a series of compartments or reaction zones by means of a plurality of horizontally disposed annular disks or baffles 60, the baffles being spaced longitudinally of the hydrogenator. The outer diameter of each baffle 60 is such that the baffles fit snugly within cylinder 32, the inner diameter being slightly larger than the outer diameter of shaft 38, so as to afford slight mechanical clearance therebetween. The reacting materials flowing upwardly are thus caused to flow through the restricted annular passages defined between shaft 38 and baffles 60 in moving from each compartment or reaction zone to the next higher zone, retention of the materials in each zone for a substantial length of time being assured. "Channeling," or too rapid movement of insufficiently reacted materials through and out of the hydrogenator, is thereby avoided. The baffles 60 may be retained in proper spaced relation by a series of spacing sleeves, the several sleeves fitting snugly within cylinder 32, so that each of the baffles is clamped between an adjacent pair of sleeves 61. Each of the sleeves 61 may be formed with longitudinally extending slots 62, as shown more particularly in Figure 4, to reduce the weight of the sleeves and to increase the volume and capacity of the several reacting zones. An efficient hydrogenator may be provided with as many as 11 baffles, or even more, so as to provide 12 or more reacting zones, but the number of zones may be varied widely.

In order to effect intense agitation of the material, each zone may be provided with a series of agitator blades 65, and with cooperating stator blades or stationary baffles 66 located above and below the agitator blades. The agitator blades 65 are disposed radially of and are bolted securely to the hollow shaft 38 in circumferentially spaced relation, one such series of agitator blades being shown in dotted lines in Figure 4. In order to prevent leakage of the reacting materials past the securing bolts to the interior of the shaft 38, a sleeve 68 extending within and over the major portion of the length of shaft 38, is welded to the latter at each end. The circumferentially spaced stator blades 66 are likewise disposed radially of the axis of shaft 38, and are bolted or are otherwise secured to the sleeves 61 adjacent each of the annular disks 60, preferably intermediate the slots 62 formed in sleeve 61, as shown in Figure 4. It will be observed that each reaction zone is provided with one series of agitator blades 65 and two series of cooperating stator blades 66, the latter acting to resist continuous swirling movement of the reacting materials about shaft 38 and otherwise serving to increase the degree of agitation imparted to the materials. Preferably, blades 65 and 66 in adjacent series are so dimensioned as to afford only the necessary mechanical clearance between each other; similarly, only mechanical clearance is afforded between the stator blades 66 and the shaft 38 and between the agitator blades 65 and the sleeves 61.

In the particular hydrogenator illustrated, we effectively avoid undue contamination of the finished product with raw oil or with insufficiently hydrogenated oil by a combination of two provisions: first, the relatively long passage between the walls of cylinder 32 and the central shaft 38 through which the reaction mixture passes on its way from the entrance to the exit of the hydrogenator, the flow through this passage being interrupted repeatedly by a series of transverse agitators separated by a corresponding series of stator blades tending to break up swirling induced by the agitators; and second, the horizontal circular baffles, elements 60, which subdivide the reaction zone into a plurality of lesser zones each communicating with the adjoining one by means of a passage of greatly restricted cross-sectional area.

This design of the hydrogenator also provides a path of adequate length for the complete utilization of the gaseous hydrogen in the hydrogenation of the oil.

The practice of the invention in a typical case will be explained in terms of a specific example. Refined and bleached prime cottonseed oil was pumped at a rate of 505 pounds per hour through a preheater in which its temperature was raised to 106° C., and thence into and through a continuous hydrogenator resembling the one shown in Figures 3 and 4. The internal dimensions of this hydrogenator were a diameter of 8 inches (inside diameter of element 32), a height of 97 inches, and a free space volume of 2164 cubic inches, and the speed of its agitator was 200 R. P. M. Simultaneously a slurry or promoted nickel hydrogenation catalyst having an activity value of 4.7 (as hereinafter explained) in a portion of the same refined and bleached cottonseed oil was introduced into the hydrogenation zone at a rate of 8.8 pounds per hour, this amount of slurry containing 0.44 pound of nickel and 8.3 pounds of oil. A stream of purified hydrogen made by the steam-iron process was metering into the oil feed line at a pressure of 100 pounds per square inch. The rate of hydrogen inflow, corrected to standard conditions, was 297 cubic feet per hour. Throughout the hydrogenation the ratio of hydrogen supply to total oil supply, including oil in catalyst slurry, was kept constant at 297 cubic feet of hydrogen per 513.3 pounds of oil. A sufficient flow of cooling water was passed through the jacket of the hydrogenator to keep the outlet hydrogenated oil temperature at 103° C. No free gaseous hydrogen was present in the oil leaving the hydrogenator, and there was no bleed from the gas outlet of tank 25. The oil leaving the hydrogenator was then reduced in pressure to a few pounds above atmospheric, it was then passed through a tubular cooler in which its temperature was reduced to about 60° C., then through another vented tank 27 from the top of which a small amount of gas (presumably nitrogen and/or unconsumed hydrogen) was withdrawn, and the substantially gas-free oil was then passed through a filter press for the removal of catalyst.

By this process the cottonseed oil was reduced in iodine value from 112 to 70.6 in slightly less than six minutes, the average hardening rate being 7 iodine value units drop per minute. The iodine value of the finished hydrogenated oil discharged from the process remained constant at 70.6 as long as the ratio of hydrogen to oil supplied to the hydrogenator remained at the aforementioned value.

The "activity value" of the catalyst referred to in connection with this example is the drop in the butyro refractive index of a 200 gram sample of refined, bleached, and rebleached cottonseed oil hydrogenated for just 30 minutes at 100° C. in the presence of an amount of the catalyst which just contains 0.20 gram of nickel and 0.80 gram of kieselguhr, in a vigorously mechanically agitated glass vessel through which electrolytic hydrogen gas at approximately atmospheric pressure is passed at a rate of 0.08 cubic feet per minute, measured at standard conditions, all conditions of the test being standardized in a manner designed to give favorable and reproducible hydrogenation results.

In the practice of the invention, suitable relative quantitative rates of supply of the oil and the hydrogen may be predetermined by calculating the stoichiometric amounts for the desired iodine value drop, employing the formula:

Cubic feet of hydrogen, at standard conditions, per 100 pounds of oil to be hydrogenated = 1.415 multiplied by (initial iodine value minus desired final iodine value).

It is frequently more convenient, however, to establish the correct rate of hydrogen supply in proportion to the oil flow by a simple trial and error procedure. For any given glyceride oil it is a simple matter to determine the refractive index corresponding to its desired iodine value (or its desired congeal point or other index) after hydrogenation. As soon as the flow of oil and catalyst and hydrogen have been started through the hydrogenator under suitable temperature, pressure, and agitation conditions, employing proportions roughly estimated as being reasonably suitable, the amount of hydrogen supplied is adjusted so that it is about 10 to 20 per cent less than that amount at which an excess of free hydrogen begins to appear in the gas separating tank 25. As soon as equilibrium conditions are established the refractive index of the outgoing hydrogenated oil is determined and if it is too high (indicating insufficient hydrogenation) the rate of oil feed is decreased until the desired refractive index is obtained; if it is too low the rate of oil feed is increased until the desired refractive index value is obtained. Thereafter as long as the same oil is being supplied under fixed conditions of gas supply rate to total oil supply rate, and under reasonably constant conditions of temperature, pressure, catalyst amount and activity, and agitation, the refractive index and other physical characteristics of the hydrogenated oil will remain substantially constant.

Referring now to Figure 2, a typical use of my process in conjunction with catalyst recycling will be described. Those elements of equipment of Figure 2 which correspond to similar elements of Figure 1 are given corresponding numbers although in the one hundred series.

The unsaturated oil to be hydrogenated is delivered from supply tank 110 by means of pump 112, which is operated at a speed bearing a predetermined relation, which may be varied, to the speed of gas meter 111, into the solids discharge compartment of rotary filter 128 where it picks up the used catalyst filtered from the hydrogenated oil leaving the process. The resulting slurry of unsaturated oil and used catalyst is picked up by pump 131 and delivered (except for the portion diverted to filter 132) through a tubular heater 113 to and through the hydrogenator 114. A suitable hydrogenation catalyst suspended in a small quantity of the oil to be hydrogenated is delivered from catalyst supply tank 115 by means of pump 116 into the main oil line ahead of heater 113, pump 116 also being operated at a speed bearing a predetermined relation, which may be varied, to the speed of gas meter 111. The fresh catalyst continuously supplied by pump 116 is augmented by the supply of previously used catalyst introduced into the unhydrogenated oil stream in the base of filter 128. Pumps 112 and 116 and meter 111 form parts of a fluid proportioning device 117, which may suitably be a device such as is described in Short Patent 2,024,480. A continuous supply of hydrogen is introduced into the oil feed pipeline at a point ahead of the hydrogenator, for example at point 118, by means of compressor 120, the hydrogen supply being drawn from a suitable reservoir or constant pressure supply, as illustrated at 119, and measured through a positive displacement rotary gas meter 111, and its rate of introduction being controlled by pressure control valve 121. While flowing through the hydrogenator 114, the mixture of the oil to be hydrogenated, the catalyst, and the hydrogen is subjected to violent agitation. The heat of reaction which is liberated may be partially or completely removed by circulating a cooling medium through a jacket surrounding the reaction space in the hydrogenator, the cooling medium being circulated by means of pump 122 and the heat being removed from the cooling medium in heat exchanger 123. The reaction mixture passing through hydrogenator 114 is maintained at superatmospheric pressure, and the pressure may conveniently be regulated by means of the adjustable relief valve 124 in the outlet line leading from the hydrogenator. If at times of abnormal operation the hydrogen supplied to the process is not all consumed and/or dissolved in the outgoing hydrogenated product any surplus gaseous hydrogen may be separated from the hydrogenation product and bled off through the top of small tank 125. The hydrogenated oil leaving the hydrogenator is cooled by means of heat exchanger 126, and any remaining gas which has come out of solution subsequent to the drop in pressure at valve 124 is then separated from the hydrogenated oil in small tank 127.

The catalyst is separated from the hydrogenated oil by means of a suitable continuous filter, preferably an enclosed rotary filter. In order to facilitate adequate catalyst separation it is frequently desirable to include a substantial amount of kieselguhr along with the new catalyst supplied from tank 115. The catalyst that is separated from the hydrogenated oil by filter 128 is in the form of a heavy mud, and this is slurried in fresh oil entering the process as previously explained.

The stream of used catalyst slurried in new oil which is delivered from pump 131 is divided into two portions at point 140, the portion which is to be re-used being passed through heater 113 as previously stated. The other portion passes through metering pump 143 of proportioning device 141, and through an observation window, indicated at 146, of unit 144 (referred to as an "optical density unit") to spent catalyst filter 132, which may conveniently be a smaller model of the filter indicated at 128. The catalyst removed from the oil by filter 132 is discharged from the system as spent catalyst, while the oil which passes through the filter medium is picked up by pump 153 and returned to the new oil supply line at some convenient point, as at 154.

The new catalyst slurry which is continuously introduced through metering pump 116 passes through observation window 147 of unit 144 and through metering pump 148, which operates at a speed such that its volumetric delivery rate is the same as that of pump 116, and into the stream of recirculated used catalyst at point 150. (By suitable regrouping of equipment a single pump may be used in place of both pumps 116 and 148.) Pump 151 boosts the pressure on the combined catalyst and oil supply sufficiently to force it through preheater 113 and hydrogenator 114 against the back pressure of relief valve 124.

The so-called optical density unit, 144, which forms no part of the present invention, may be any suitable device for judging—and measuring and/or recording if desired—the relative concentrations of catalyst suspended in the oil streams passing through pumps 143 and 148. This device may appropriately be provided with two identical observation windows, 146 and 147, each comprising two parallel glass panes separated by a small fraction of an inch, with connections whereby representative fractions of the oil streams are caused to flow between the panes of the respective windows. Identical light sources, or a common light source, placed to show through the double pane windows provide a convenient means of measuring, by the intensity of the transmitted light, the relative concentrations of catalyst in the two oil streams.

The light passing through the observation windows may if desired be caused to act upon appropriately placed photo-electric cells, and the resulting electric currents may then be employed to indicate or to record the relative slurry concentrations or to operate an automatic control device, for example a speed regulator to control the relative volumetric delivery rate of the slurry passing to filter 132 so as to preserve an equality of slurry concentration multiplied by volume of slurry in the streams delivered through pumps 143 and 148. Instead of automatic control, to secure a balance of catalyst removed from the system as against catalyst continuously introduced, one may alternatively employ manual control.

Practice of the invention with apparatus such as is indicated in Figure 2 may be performed in a number of different ways. A preferred manner of operation is to decide upon the concentration of catalyst (including both new and recirculated used catalyst) desired within the hydrogenator 114, and then to provide a new catalyst slurry of this same concentration in catalyst supply tank 115. Then when metering pumps 143 and 148 are so regulated as to deliver equal volumes of slurry the result will be that, after the entire hydrogenation system has been set in operation and has attained equilibrium operating conditions, the number of pounds per hour of nickel in new catalyst entering the system through pump 148 will substantially equal the number of pounds per hour of nickel in spent catalyst leaving the system through pump 143. With this mode of operation there is no necessity for unit 144, although it may be employed merely to indicate whether or not the catalyst input and output have reached a balance.

As an example of the foregoing mode of operation, catalyst tank 115 is supplied with a slurry of promoted nickel catalyst and kieselguhr such that each 100 pounds of oil in this slurry contains 1.0 pound of nickel. This slurry is delivered through pumps 116 and 148 at a volumetric rate amounting to about one ninth the volumetric rate of new oil delivered from supply tank 110. During the start of operation with the apparatus of Fig. 2 pump 148 is operated independently, with pump 143 stopped, thus for the time being retaining all catalyst in the system, and recycling all used catalyst through the hydrogenator. These conditions are maintained until the concentration of catalyst in oil at point 140 is the same as the concentration of new catalyst in the oil supplied from tank 115, whereupon pump 143 is started at a rate such as to deliver the same volumetric amount of slurry as pump 148. During the first few minutes of operation an extra amount of kieselguhr may be introduced into the system in order that a good filter bed will be rapidly built up on the filtering surfaces of filters 128 and 132. After operation has become uniform the concentration of catalyst in hydrogenator 114 will be approximately one pound of nickel per 100 pounds of oil, whereas the rate of introduction of new catalyst will be at the rate of one pound of nickel per 1000 pounds of oil, the average particle of catalyst being passed through the hydrogenator ten times, each time with a new supply of oil, before it is finally discharged from the system.

If it is inconvenient to provide a catalyst slurry in tank 115 that is as dilute as that desired in hydrogenator 114, one may employ a more concentrated slurry in tank 115 and regulate proportioning device 141 so that pump 143 withdraws spent catalyst slurry at a faster rate than the volumetric rate of introduction of the more concentrated new catalyst slurry through pump 148, determining the proper ratio of these pump delivery rates in inverse proportion to the optical densities as judged by unit 144.

The recycling of catalyst in a manner such as illustrated in Figure 2 may advantageously be practiced when substantially fully hydrogenating a glyceride oil to an iodine value approaching zero. Under these circumstances it is unnecessary to meter the hydrogen in stoichiometric proportion to the oil feed rate, and in fact it is preferable to employ an excess of hydrogen in this case, drawing off surplus unconsumed gaseous hydrogen from the top of separating tank 125.

It will be appreciated that the invention is not limited to the foregoing description or examples, and that many variations in the apparatus and operating procedure are included within the scope of the appended claims.

Instead of introducing all reactants into the bottom portion of the hydrogenation vessel, as illustrated in the drawings, the oil and catalyst may be introduced at the top and withdrawn at the bottom. With the hydrogen inlet at the bottom this results in a countercurrent operation and in a reduction in the rate of rise of bubbles of free hydrogen gas through the hydrogenator, both of these being generally advantageous factors. The hydrogenator may if desired be mounted horizontally instead of upright, in which case each of baffles 60 (now vertical) is provided with an opening along its upper edge to permit passage of hydrogen along the length of the vessel.

Having thus described my invention, what I claim and desire to secure by Letters Patent is:

1. The continuous process of partially hydrogenating unsaturated fatty acids and esters thereof to a desired endpoint, which comprises: (1) continuously flowing the unsaturated material at a known rate into, through, and out of a confined hydrogenation zone, said zone containing a highly active hydrogenation catalyst, at about 100° C. to about 250° C. temperatue, (2) continuously metering hydrogen into said zone at a gauge pressure between about 20 and about 500 pounds per square inch and in amount stoichiometrically proportioned to the desired reduction in the iodine value of the inflowing unsaturated material (upon reaction therewith), and (3) mechanically inducing violent and turbulent agitation within said zone to effect contact of said material and said hydrogen simultaneously with said catalyst, thereby causing hydrogenation of said material to proceed at a rapid rate; the flow of said material into and through said zone being effected at a rate permitting the desired reduction in iodine value and substantially complete utilization of hydrogen to occur before the material leaves said zone.

2. The process of claim 1, in which the hydrogenation occurs at a rate averaging in excess of a reduction of 5 iodine value units per minute.

3. The process of claim 2, in which catalyst in finely divided form is continuously introduced into the hydrogenation zone, in which the said catalyst is continuously separated from the partially hydrogenated material leaving said zone, and in which a major fraction of said separated catalyst is continuously returned to the inlet side of the hydrogenation zone, the rate of withdrawal of used catalyst from the system substantially equalling the rate of introduction of new catalyst into the system.

4. In the continuous process of hydrogenating unsaturated glyceride oil at a rate corresponding to a reduction in iodine value averaging at least 5 units per minute, the steps which comprise: flowing the oil at from about 100° C. to about 250° C. temperature into, through, and out of a confined hydrogenation zone; continuously introducing hydrogen into said zone at a pressure between about 20 and about 500 pounds per square inch, and in amount at least the stoichiometric equivalent of the desired reduction in the iodine value of said oil; contacting said oil and said hydrogen simultaneously within said zone with highly active hydrogenation catalyst continuously introduced in finely divided form, by maintaining mechanically induced violent agitation of a turbulent character; continuously separating catalyst from the hydrogenated oil leaving said process; and continuously returning a major fraction of said separated catalyst to the inlet side of the hydrogenation zone, the rate of withdrawal of used catalyst from the system substantially equaling the rate of introduction of new catalyst into the system.

5. In the rapid continuous partial hydrogenation of unsaturated organic liquids in which the liquid as a continuous phase is passed through a hydrogenation vessel in contact with hydrogenation catalyst and gaseous hydrogen at elevated temperature to cause hydrogenation at a rate corresponding to a reduction in iodine value averaging at least 5 units per minute, the improvement which comprises metering the hydrogen into said vessel at a rate stoichiometrically proportioned to the desired reduction in the unsaturation of a metered stream of said liquid, with no excess of hydrogen, the length of the path of said reactants within the hydrogenation zone being adequate for the complete utilization of the gaseous hydrogen in hydrogenating the liquid.

VICTOR MILLS.

REFERENCES CITED

The following references are of record in the file of this patent:

UNITED STATES PATENTS

| Number | Name | Date |
|---|---|---|
| 1,856,120 | Valentine | May 3, 1932 |
| 2,163,602 | Jenness | June 27, 1939 |
| 2,163,603 | Jenness | June 27, 1939 |
| 2,164,291 | Jenness | June 27, 1939 |
| 2,389,284 | Turck | Nov. 20, 1945 |